United States Patent
Li et al.

(10) Patent No.: US 8,031,970 B2
(45) Date of Patent: Oct. 4, 2011

(54) METHOD OF RESTORING CLOSED-EYE PORTRAIT PHOTO

(75) Inventors: Shu Li, Hangzhou (CN); Han Qiu, Hangzhou (CN); Jin Wang, Hangzhou (CN)

(73) Assignee: ArcSoft, Inc., Fremont, CA (US)

( * ) Notice: Subject to any disclaimer, the term of this patent is extended or adjusted under 35 U.S.C. 154(b) by 1036 days.

(21) Appl. No.: 11/892,697

(22) Filed: Aug. 27, 2007

(65) Prior Publication Data

US 2009/0060383 A1 Mar. 5, 2009

(51) Int. Cl.
*G06K 9/20* (2006.01)
*G06K 9/40* (2006.01)
*G06K 9/34* (2006.01)

(52) U.S. Cl. .......................... 382/282; 382/275; 382/173

(58) Field of Classification Search .................... 382/282
See application file for complete search history.

(56) References Cited

U.S. PATENT DOCUMENTS

| | | | | |
|---|---|---|---|---|
| 5,850,475 A * | 12/1998 | Kasao | ............................ | 382/173 |
| 5,878,156 A * | 3/1999 | Okumura | ....................... | 382/118 |
| 6,195,458 B1 * | 2/2001 | Warnick et al. | ................ | 382/173 |
| 6,247,813 B1 * | 6/2001 | Kim et al. | ....................... | 351/206 |
| 6,292,574 B1 * | 9/2001 | Schildkraut et al. | ........... | 382/117 |
| 6,539,100 B1 * | 3/2003 | Amir et al. | ...................... | 382/117 |
| 6,728,404 B1 * | 4/2004 | Ono et al. | ....................... | 382/190 |
| 6,898,300 B1 * | 5/2005 | Iwaki | ............................. | 382/117 |
| 7,088,855 B1 * | 8/2006 | Vide | ............................... | 382/167 |
| 7,116,820 B2 * | 10/2006 | Luo et al. | ....................... | 382/167 |
| 7,224,850 B2 * | 5/2007 | Zhang et al. | ................... | 382/275 |
| 7,336,821 B2 * | 2/2008 | Ciuc et al. | ...................... | 382/167 |
| 7,376,270 B2 * | 5/2008 | Chen et al. | ..................... | 382/167 |
| 7,447,359 B2 * | 11/2008 | Tu et al. | .......................... | 382/173 |
| 7,469,060 B2 * | 12/2008 | Bazakos et al. | ................ | 382/173 |
| 7,583,831 B2 * | 9/2009 | Tu et al. | .......................... | 382/131 |
| 7,634,152 B2 * | 12/2009 | Silverstein | ..................... | 382/275 |
| 7,652,695 B2 * | 1/2010 | Halpern | ........................ | 348/239 |
| 7,664,329 B2 * | 2/2010 | Boregowda et al. | ........... | 382/225 |
| 7,676,063 B2 * | 3/2010 | Cohen et al. | .................... | 382/103 |
| 7,706,609 B2 * | 4/2010 | Bennett et al. | ................. | 382/167 |
| 7,848,567 B2 * | 12/2010 | Chiu et al. | ...................... | 382/164 |
| 7,881,540 B2 * | 2/2011 | Neemuchwala et al. | ..... | 382/225 |
| 2003/0118248 A1 * | 6/2003 | Kyong | .......................... | 382/266 |
| 2003/0223635 A1 * | 12/2003 | Russon et al. | ................. | 382/167 |
| 2004/0070598 A1 * | 4/2004 | Enomoto | ....................... | 345/732 |
| 2005/0105780 A1 * | 5/2005 | Ioffe | .............................. | 382/118 |
| 2005/0219665 A1 * | 10/2005 | Mino | .............................. | 358/537 |
| 2007/0154096 A1 * | 7/2007 | Cao et al. | ....................... | 382/190 |
| 2007/0189627 A1 * | 8/2007 | Cohen et al. | ................... | 382/254 |
| 2007/0195174 A1 * | 8/2007 | Oren | ........................... | 348/222.1 |

(Continued)

*Primary Examiner* — Bhavesh Mehta
*Assistant Examiner* — Michelle Entezari
(74) *Attorney, Agent, or Firm* — Bacon & Thomas, PLLC (57) ABSTRACT

The present invention is to provide a method of restoring closed-eye portrait photo, which comprises the steps of detecting the locations and range of the eyes of a portrait photo being taken, retrieving a patch of a designated range of the eyes area and its neighboring area which represents the expression of the eyes and its neighboring area, determining whether the eyes of said patch are open or closed by using an eyes state classifier, temporarily storing said patch as an open-eye templet when it is determined that the eyes are open, detecting the locations and range of the eyes of a subsequently taken portrait photo, calculating an eyes restoration area when it is determined that the eyes are closed, replacing the closed-eye patch with said open-eye templet, and performing fusion operation toward said eyes restoration area to ensure that each portrait photo generated is with the eyes opened.

4 Claims, 5 Drawing Sheets

U.S. PATENT DOCUMENTS

| | | | |
|---|---|---|---|
| 2007/0201724 A1* | 8/2007 | Steinberg et al. | 382/103 |
| 2007/0201725 A1* | 8/2007 | Steinberg et al. | 382/103 |
| 2007/0237421 A1* | 10/2007 | Luo et al. | 382/284 |
| 2008/0045847 A1* | 2/2008 | Farag et al. | 600/500 |
| 2008/0089560 A1* | 4/2008 | Li et al. | 382/118 |
| 2008/0273110 A1* | 11/2008 | Joza et al. | 348/333.05 |

* cited by examiner

METHOD OF RESTORING CLOSED-EYE PORTRAIT PHOTO

FIELD OF THE INVENTION

This invention relates to a correction method for a portrait photo, more particularly to a method applied to an electronic photographing device capable of automatically replacing a closed-eye patch on the portrait photo with an open-eye templet retrieved and stored in advance, when detecting and determining that the eyes on the portrait photo being captured are closed, and performing fusion operation toward the eyes restoration area to ensure that each portrait photo generated is with the eyes opened.

BACKGROUND OF THE INVENTION

As the innovation of the digital photographing technology in recent years, various electronic devices (such as digital camera, digital video, notebook and mobile phone etc.) equipped with digital photographing component keep emerging. Not only the quality of the photos are getting much better, but the size of the devices become more compact and the prices thereof are getting cheaper as well which make said electronic photographing devices more and more popular. Therefore, to develop an electronic device with intellectual photographing function that fulfills the basic photographic requirements of most of the users and is capable of compensating the lack of photographing technique has become the current trend of the designers and manufacturers of all kinds of electronic photographing devices.

Generally, the conventional electronic photographing device is mainly used to take portrait photos. When taking a portrait photo, the conventional electronic photographing device will try to capture the most appropriate photo by constantly scanning the human face in order to present the best appearance of the model. And to most of the users, the best appearance of the model is that the model keeps a smiley face and with the eyes opened. Therefore, when taking a portrait photo, the photographer is expected to capture the moment that the model has a smile on the face. However, due to lack of communication or mutual understanding, the model is often not aware of the moment that the photographer takes the photo which leads to closed eyes and unnatural expressions. Even when the model is informed to keep the smiley face for taking the photo, still the model could closed the eyes unexpectedly for being unable to maintain the same expression for a long time, thus makes a smiley face turn into an unnatural expression. And all these cases will lead to portrait photos with unnatural or plain expressions and aren't well satisfying. Especially when taking photos of various people or children, the problems stated above are nearly inevitable, and it will be such a great pity without a well-shot photo for the memorable day. Thus, it is the major objective of the designers and manufacturers of all kinds of electronic photographing devices to develop a photo restoration technique which enables the electronic photographing device to determine whether the portrait photo taken is with the eyes closed and to proceed an automatic restoration process to restore the unnatural expression to a normal one when it is determined that the eyes are closed, such as to automatically restore a closed-eye portrait photo to an open-eye portrait photo, thereby ensures the quality of each portrait photo generated and substantially increases the possibility of making a well-shot photo.

SUMMARY OF THE INVENTION

For the purpose of solving the problem that the conventional electronic photographing device is unable to determine whether the model is with his or her eyes closed or with an unnatural expression which leads to portrait photos far from satisfactory, after hard work of research and experiments for a long time, the inventor has developed a method of restoring closed-eye portrait photo of the present invention.

One of the objectives of the present invention is to provide a method of restoring closed-eye portrait photo applied to an electronic photographing device. Said method comprises the steps of detecting the locations and range of the eyes of a portrait photo being taken, retrieving a patch of a designated range of the eyes area and its neighboring area which represents the expression of the eyes and its neighboring area, determining whether the eyes of said patch are open or closed by using an eyes state classifier, temporarily storing said patch as an open-eye templet when it is determined that the eyes are open, detecting the locations and range of the eyes of a subsequently taken portrait photo, calculating an eyes restoration area when it is determined that the eyes are closed, replacing the closed-eye patch with said open-eye templet, and performing fusion operation toward said eyes restoration area to ensure that each portrait photo generated is with the eyes opened.

Another objective of the present invention is to provide a method of restoring closed-eye portrait photo applied to a photo processing device. Said method comprises the steps of detecting the locations and range of the eyes of an input portrait photo, retrieving a patch of a designated range of the eyes area and its neighboring area, determining whether the eyes of said patch are open or closed by using an eyes state classifier, temporarily storing said patch as an open-eye templet when it is determined that the eyes are open, calculating an eyes restoration area while processing other photo of the same human face and determined that the eyes are closed, replacing the closed-eye patch with said open-eye templet, and performing fusion operation toward said eyes restoration area to generate a portrait photo with the eyes opened.

BRIEF DESCRIPTION OF THE DRAWINGS

The objectives, processes and functions of the present invention will become more apparent and better appreciated by reference to the following detailed description of the preferred embodiments when taken in conjunction with the accompanying drawings, wherein.

DETAILED DESCRIPTION OF THE PREFERRED EMBODIMENT

Figure 2:
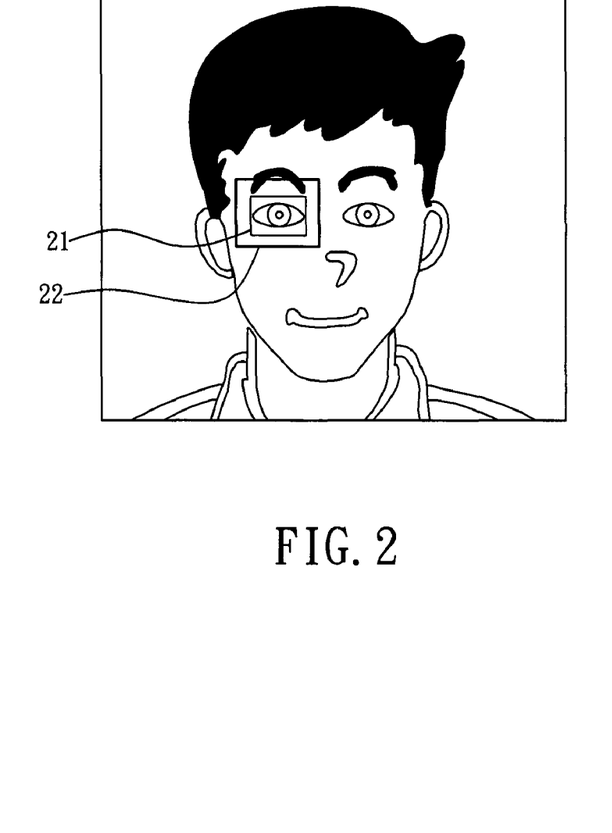
FIG. 2 shows the operations of the detection method while detecting the eyes of the portrait photo according to an embodiment of the present invention.
Figure 3:
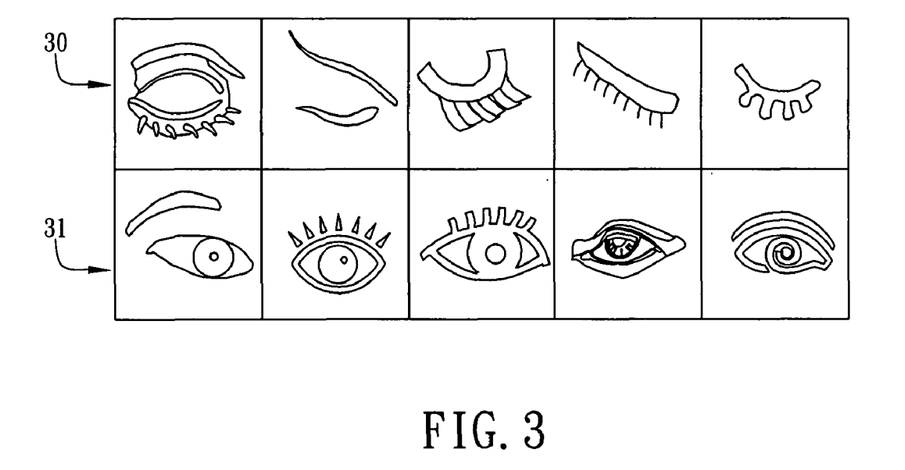
FIG. 3 shows a certain number of eyes photo samples with open and closed eyes utilized to create a classifier based on the AdaBoost algorithm according to an embodiment of the present invention.
Figure 4:
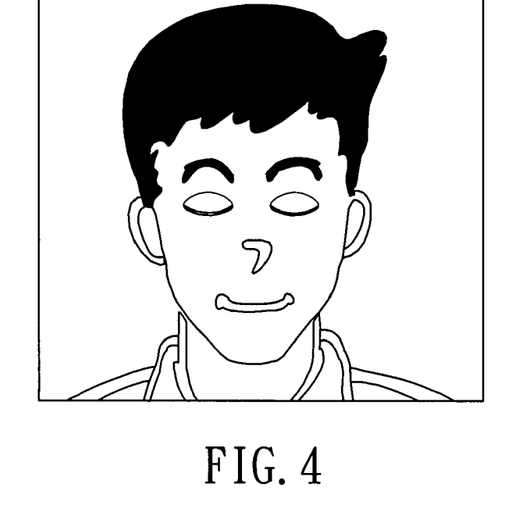
FIG. 4 is a closed-eye portrait photo taken by the electronic photographing device.
Figure 5:
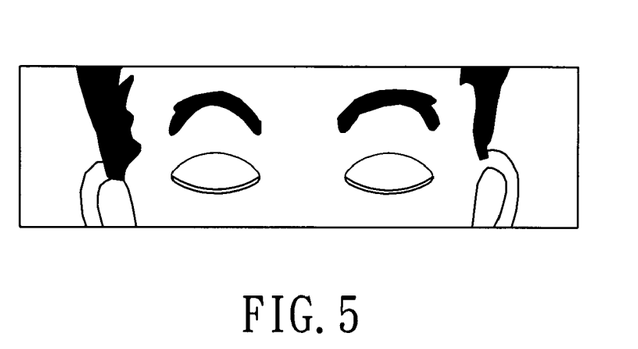
FIG. 5 shows a specified area of the portrait photo shown in FIG. 4.
Figure 6:
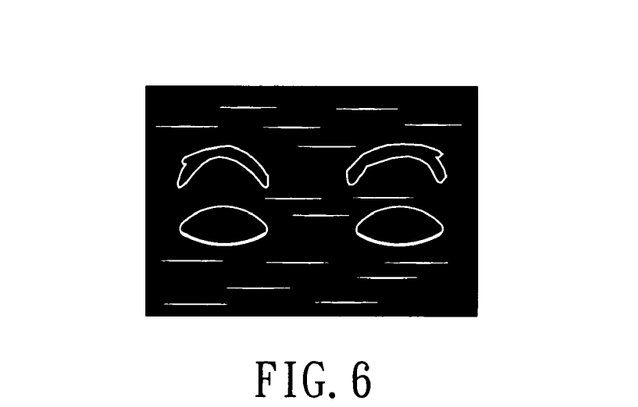
FIG. 6 shows a photo of the edge magnitude of the eyes acquired by performing haar operation toward the specified area shown in FIG. 5.
Figure 7:
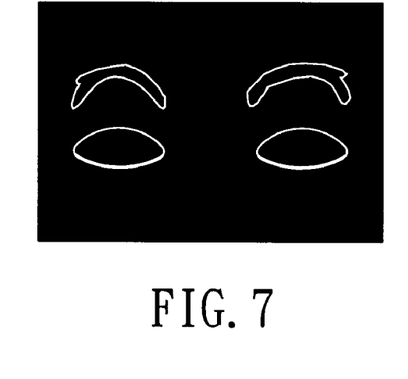
FIG. 7 shows a filtered photo of the edge magnitude of the eyes acquired by filtering the photo of the edge magnitude of the eyes shown in FIG. 6.
Figure 8:
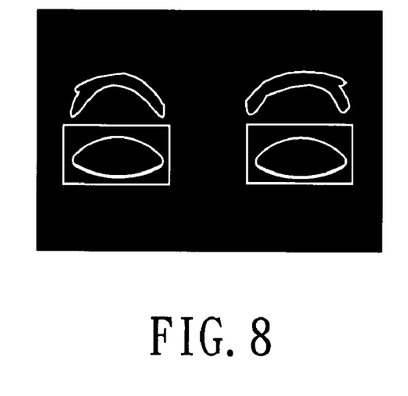
FIG. 8 shows the center of both eyes acquired by performing k-mean clustering analysis toward the filtered photo of the edge magnitude of the eyes shown in FIG. 7.
Figure 9:
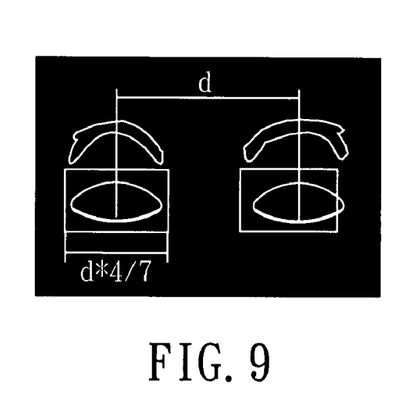
FIG. 9 shows the calculated restoration areas based on the center of each eye shown in FIG. 8.

According to a first embodiment of the present invention, the method of restoring closed-eye portrait photo is applied to an electronic photographing device which may be an electronic device equipped with a digital photographing component (such as a CCD or CMOS photographing component) such as a digital camera, digital video, notebook or mobile phone, and enables said electronic photographing device to restore the eyes area and designated neighboring area which represent the face expressions and generate an open-eye portrait photo when it is determined that the portrait photo taken is with the eyes closed. Please refer to FIG. 1, in said embodiment, when taking a portrait photo by using said electronic photographing device, said method of the present invention makes said electronic photographing device perform following steps:

(101) taking a current photo through the digital photographing component;
(102) proceeding face detection toward said photo, wherein the algorithms used have been disclosed in various public documents such as the OpenCV face detection software designed by using the AdaBoost operation, Haar-like features and related recognition technology. Said software comprises a human face classifier (i.e. a classifier for distinguishing between human face and non-human face) created based on a certain number of portrait photo samples and capable of detection the human face in the photo. Due to that said detection algorithm itself belongs to the field of the conventional skills and is not intended to be claimed by the present invention, the content thereof won't be described in detail herein;
(103) determining whether there exists any feature of human face in said photo, proceeding to step (104) when affirmative, otherwise returning to step (101) and taking a current photo through the digital photographing component again;
(104) marking the location and range of the human face on the photo and detecting the locations and range of the eyes, wherein the algorithm used, as stated above, has been disclosed in various public documents, is an eyes classifier (i.e. a classifier for distinguishing eyes from others) created based on a certain number of eyes photo samples. Due to that the eyes classifier itself belongs to the field of the conventional skills and is not intended to be claimed by the present invention, the content thereof won't be described in detail herein;
(105) determining whether there exists any feature of eyes in said photo, proceeding to step (106) when affirmative, otherwise returning to step (101) and taking a current photo through the digital photographing component again;
(106) marking the locations and range of the eyes on the photo as the black frame 21 in FIG. 2, extending the detection area by certain ratio such as 1.5 times of the length and width of the original eyes as the white frame 22 in FIG. 2, then retrieving a patch within designated range of the eyes area and its neighboring area according to the extended detection area, wherein said patch may represent all kinds of expressions revealed by the eyes under the reason that said patch comprises both the eyes area and its neighboring area;
(107) detecting the state of the eyes of said patch, i.e. the state represented by the eyes, wherein the algorithm used, as stated above, with reference to FIG. 3, may be an eyes state classifier using the AdaBoost algorithm and created based on a certain number of eyes state samples 30 and 31 with open eyes and closed eyes;
(108) determining whether the eyes of said patch are open or closed, proceeding to step (109) when the eyes are open, or proceeding to step (111) when the eyes are closed as shown in FIG. 4;
(109) temporarily storing said patch as an open-eye templet;
(110) storing current photo into a memory or storage component (such as a hard disk or memory card etc.) of said electronic photographing device, then returning to step (101) and taking a current photo through the digital photographing component again;
(111) storing current photo into a memory or storage component of said electronic photographing device;
(112) determining whether any open-eye templet is temporarily stored in said electronic photographing device, proceeding to step (113) when affirmative, otherwise returning to step (101) and taking a current photo through the digital photographing component again;
(113) calculating an eyes restoration area by performing the following operations:
   (a) Normalization of the eyes area: retrieving the area of the upper 60% of the portrait photo, and making it to a size of 100 by 100 pixels as the eyes area as shown in FIG. 5;
   (b) calculating the edge of the eyes: performing haar-like filtering operation in horizontal direction with an area of 3 by 3 pixels as the operand toward the edge of the eyes within said area to acquire a photo of the edge magnitude of the eyes as shown in FIG. 6;
   (c) filtering the skin color: removing the area not corresponding to the skin color of the human face from the photo of the edge magnitude of the eyes shown in FIG. 6 according to the original skin color information shown in FIG. 5 to acquire a filtered photo of the edge magnitude of the eyes as shown in FIG. 7 so as to eliminate the background interference;
   (d) acquiring the locations of the pupils: performing k-mean clustering analysis toward the photo of the edge magnitude of the eyes of FIG. 7 to acquire the center of both eyes as shown in FIG. 8, i.e. the locations of the pupils (x, y) and interval d between them;
   (e) estimating the size of the restoration area: calculating the size of the restoration area as the white frames shown in FIGS. 8 and 9 based on the locations of the pupils and the interval d with the following formulas:

$$w = d*4/7$$

$$h = w*12/19$$

where d is the interval between the pupils, w and h are the width and height of the eyes restoration area respectively, thus acquiring the estimated eyes restoration area w*h with the pupil as its center; and
   (f) mapping the coordinates and size of the restoration area to the original photo:

$$w' = w*w_f/100$$

$$h' = h*h_f/100$$

where w' and h' are the width and height respectively after the eyes restoration area is mapped to the original photo, and $w_f$ and $h_f$ are the width and height of the human face of the original photo respectively.

Figure 1:
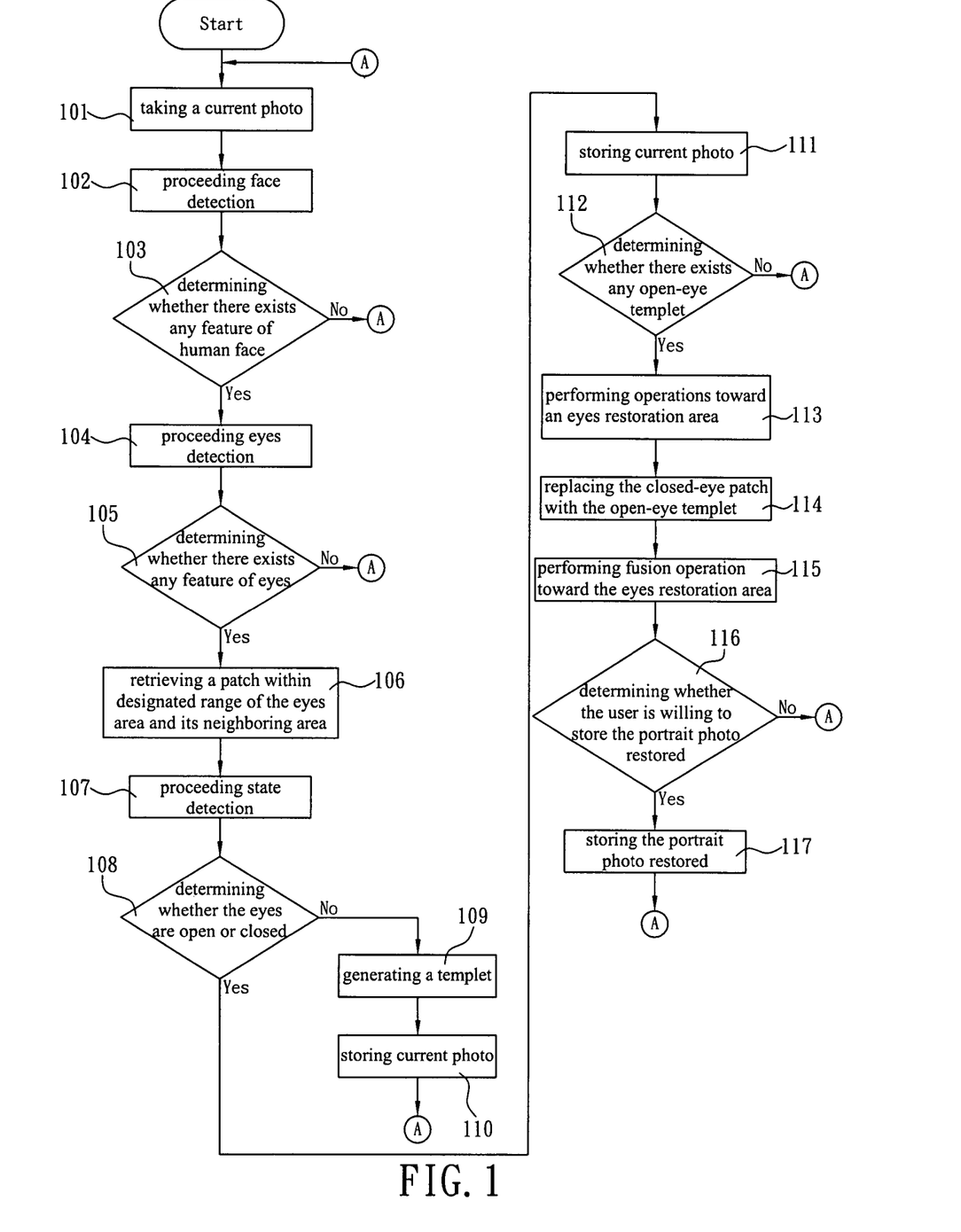
FIG. 1 is a flow chart of the method of detecting the eye state and restoring close eyes of a portrait photo applied to an electronic photographing device according to an embodiment of the present invention.
Figure 10:
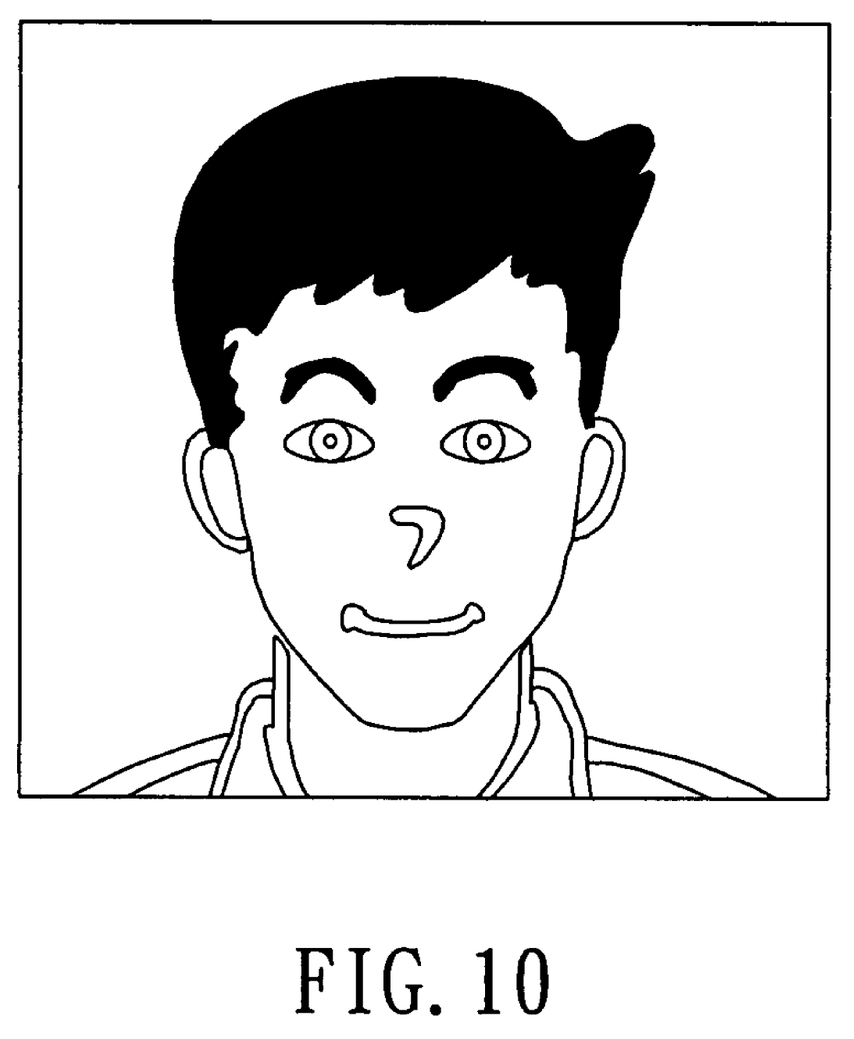
FIG. 10 shows an open-eye portrait photo restored from the portrait photo shown in FIG. 4 according to an embodiment of the present invention.

(114) replacing the closed-eye patch with said open-eye templet;

(115) performing fusion operation toward the eyes restoration area and its neighboring area which adjusts the color of the area near the border of said two areas based on the difference between the color of the eyes restoration area and that of its neighboring area to generate an open-eye portrait photo as shown in FIG. 10. Due to that the algorithm of fusion operation has been disclosed in various public documents, and the algorithm itself belongs to the field of the conventional skills and is not intended to be claimed by the present invention, the content thereof won't be described in detail herein;

(116) displaying a message on the screen to determine whether the user is willing to store the portrait photo restored, proceeding to step (117) when affirmative, otherwise returning to step (101) and taking a current photo through the digital photographing component again;

(117) storing the portrait photo restored into the memory or storage component of said electronic photographing device, thus ensures that the expression of the portrait photo generated by said electronic photographing device fits the sense of beauty well, then returning to step (101) and taking a current photo through the digital photographing component again.

According to a second embodiment of the present invention, the method of restoring closed-eye portrait photo is applied to a photo processing device which may be an electronic device without a digital photographing component like a notebook, personal digital assistant, digital camera or mobile phone etc. After reading an input portrait photo, said electronic device follows the above steps of detecting the locations and range of the eyes, retrieving a patch within designated range of the eyes area and its neighboring area, determining whether the eyes of said patch are open or closed using an eyes state classifier, and storing said patch as an open-eye templet when it is determined that the eyes are open. After that, when processing other photo of the same human face, said electronic device will follow the above steps to detect the locations and range of the eyes, and perform operations toward an eyes restoration area, replace the closed-eye patch with the open-eye templet, and perform fusion operation toward the eyes restoration area when it is determined that the eyes are closed, thereby ensures that each portrait photo generated is with the eyes open.

While the invention herein disclosed has been described by means of specific embodiments, numerous modifications and variations could be made thereto by those skilled in the art without departing from the scope and spirit of the invention set forth in the claims.

What is claimed is:

1. A method of restoring closed-eye portrait photo applied to an electronic device, comprising:
   detecting the locations and range of the eyes of an input portrait photo;
   retrieving a patch of a designated range of the eyes area and its neighboring area, wherein said patch represents the state of the designated range of the eyes area and its neighboring area;
   determining whether the eyes of said patch are open or closed by using an eyes state classifier, and temporarily storing said patch as an open-eye template when it is determined that the eyes are open;
   detecting the locations and range of the eyes of a subsequently input portrait photo according to the above steps, and calcuating an eyes restoration area when it is determined that the eyes are closed;
   replacing the closed-eye patch with said open-eye template; and
   performing fusion operation toward said eyes restoration area to generate a portrait photo with the eyes open,
   wherein said fusion operation is based on said patch and comprises steps of:
      calculating the edges of the eyes which performs haar-like filter operation in horizontal direction with an area of predetermined size as the operand to acquire a photo of the edge magnitude of the eyes within said patch;
      filtering the skin color which removes the area not corresponding to the skin color of the human face from said photo of the edge magnitude of the eyes according to the skin color information from said original portrait photo to acquire a filtered photo of the edge magnitude of the eyes;
      acquiring the locations of the pupils which performs k-mean clustering analysis toward said filtered photo of the edge magnitude of the eyes to acquire a center of both eyes, the center of the eyes including the locations of the pupils and an interval between the pupils; and
      estimating a size which calculates the width and height of said eyes restoration area based on said locations of the pupils and said interval.

2. A method of restoring closed-eye portrait photo of claim 1, wherein said estimated eyes restoration area w*h with the pupil as its center is calculated using the following formulas:

$$w=d*4/7$$

$$h=w*12/19$$

where d is said interval between the pupils and w and h are the width and height of said eyes restoration area respectively.

3. A method of restoring closed-eye portrait photo applied to an electronic device, comprising:
   detecting the locations and range of the eyes of an input portrait photo;
   retrieving a patch of a designated range of the eyes area and its neighboring area, wherein said patch represents the state of the designated range of the eyes area and its neighboring area;
   determining whether the eyes of said patch are open or closed by using an eyes state classifier, and temporarily storing said patch as an open-eye template when it is determined that the eyes are open, wherein said eyes state classifier is created based on a certain number of eyes photo samples with open eyes and closed eyes for determining whether the eyes of said patch are open or closed;
   detecting the locations and range of the eyes of a subsequently input portrait photo according to the above steps, and calculating an eyes restoration area when it is determined that the eyes are closed;
   replacing the closed-eye patch with said open-eye template; and
   performing fusion operation toward said eyes restoration area to generate a portrait photo with the eyes open,
   wherein said fusion operation is based on said patch and comprises steps of:
      calculating the edges of the eyes which performs haar-like filter operation in horizontal direction with an area of predetermined size as the operand to acquire a photo of the edge magnitude of the eyes within said patch;

filtering the skin color which removes the area not corresponding to the skin color of the human face from said photo of the edge magnitude of the eyes according to the skin color information from said original portrait photo to acquire a filtered photo of the edge magnitude of the eyes;

acquiring the locations of the pupils which performs k-mean clustering analysis toward said filtered photo of the edge magnitude of the eyes to acquire a center of both eyes, the center of the eyes including the locations of the pupils and an interval between the pupils; and estimating the size which calculates the width and height of said eyes restoration area based on said locations of the pupils and said interval.

4. A method of restoring closed-eye portrait photo of claim 3, wherein said estimated eyes restoration area $w*h$ with the pupil as its center is calculated using the following formulas:

$$w=d*4/7$$

$$h=w*12/19$$

where d is said interval between the pupils and w and h are the width and height of said eyes restoration area respectively.

* * * * *